United States Patent
Duvekot et al.

(10) Patent No.: US 8,628,286 B2
(45) Date of Patent: Jan. 14, 2014

(54) FINISH ELEMENT, CONSTRUCTION AND METHOD FOR A LIQUID-TIGHT SEALING OF A SURFACE

(75) Inventors: Joost Cornelis Duvekot, The Hague (NL); Martin Mastenbroek, Bussum (NL)

(73) Assignee: Kedge Holding B.V., Gorinchem (NL)

( * ) Notice: Subject to any disclaimer, the term of this patent is extended or adjusted under 35 U.S.C. 154(b) by 364 days.

(21) Appl. No.: 12/993,323

(22) PCT Filed: May 19, 2009

(86) PCT No.: PCT/NL2009/050268
§ 371 (c)(1),
(2), (4) Date: Dec. 14, 2010

(87) PCT Pub. No.: WO2009/142485
PCT Pub. Date: Nov. 26, 2009

(65) Prior Publication Data
US 2011/0094652 A1 Apr. 28, 2011

(30) Foreign Application Priority Data
May 19, 2008 (NL) ...................................... 2001596

(51) Int. Cl.
*F16B 33/00* (2006.01)
(52) U.S. Cl.
USPC ........ 411/369; 411/82.2; 411/371.2; 411/542
(58) Field of Classification Search
USPC ............ 411/82, 82.2, 366.2, 369, 371.2, 372, 411/372.6, 376, 429, 432, 533, 542; 277/312
See application file for complete search history.

(56) References Cited

U.S. PATENT DOCUMENTS

| | | | | |
|---|---|---|---|---|
| 3,137,197 A | * | 6/1964 | Meyer | 411/369 |
| 3,422,721 A | * | 1/1969 | Yonkers | 411/369 |
| 3,452,636 A | * | 7/1969 | Cohen et al. | 411/371.1 |
| 4,221,363 A | * | 9/1980 | Jasper | 254/98 |
| 4,302,137 A | * | 11/1981 | Hart | 411/432 |
| 4,715,756 A | * | 12/1987 | Danico et al. | 411/369 |
| 4,832,551 A | * | 5/1989 | Wollar | 411/280 |
| 4,878,697 A | | 11/1989 | Henry | |
| 5,618,145 A | * | 4/1997 | Kuo | 411/432 |
| 5,865,583 A | | 2/1999 | Krawczak et al. | |
| 5,902,084 A | * | 5/1999 | Garcia | 411/432 |
| 6,244,807 B1 | | 6/2001 | Garcia | |
| 6,695,557 B2 | * | 2/2004 | Hove et al. | 411/429 |
| 2003/0044258 A1 | * | 3/2003 | Hove et al. | 411/429 |
| 2004/0126202 A1 | * | 7/2004 | Somers et al. | 411/429 |

FOREIGN PATENT DOCUMENTS

| | | |
|---|---|---|
| DE | 3834379 A1 | 5/1989 |
| DE | 20318672 U1 | 1/2005 |
| EP | 1281821 A1 | 2/2003 |
| GB | 883340 | 11/1961 |

* cited by examiner

*Primary Examiner* — Roberta Delisle
(74) *Attorney, Agent, or Firm* — Birch, Stewart, Kolasch and Birch, LLP

(57) ABSTRACT

A finishing element 1 comprises a relatively form-retaining core body 2 connected liquid-tightly to a relatively flexible rim body 4, which here extends laterally around the core body in at least substantially liquid-tight manner. The core body 2 comprises a cavity for the purpose of receiving liquid-tightly therein an at least substantially shank-like free outer end 10 of a construction element. A finishing element 1 is thus provided with which the outer end of a construction element can be finished in reliably liquid-tight manner.

16 Claims, 8 Drawing Sheets

FINISH ELEMENT, CONSTRUCTION AND METHOD FOR A LIQUID-TIGHT SEALING OF A SURFACE

The present invention relates to a finishing element for liquid-tight finishing of an at least substantially shank-like free outer end of a construction element, comprising a relatively form-retaining core body with an inner wall which bounds a cavity intended and adapted to receive the outer end therein, and a rim which extends laterally around the core body in at least substantially liquid-tight manner, wherein a liquid barrier is provided between the core body and the free outer end.

Many different types of construction element are known, which are applied particularly in the building industry for various construction purposes. An example of such a construction element is a fastening means such as a bolt or threaded end, which protrudes with a shank-like free outer end in order to provide the possibility of attaching a device or component thereto. Another example is a passage wherein a body cavity extends through the shank-like outer end in order to for instance receive a through-cable or conduit therein.

Fitting of such a construction element usually requires a drill hole adapted thereto in a construction part for the purpose of then receiving a proximal part of the construction element therein. However, a penetration of a wall of the relevant construction part which is unavoidable here has the drawback that it will not always be possible to guarantee the integrity, and in particular leak-tightness, of this wall.

The present invention therefore has for its object, among others, to provide a finishing element of the type described in the preamble, which provides at least to a significant extent a solution to this problem.

In order to achieve the intended object a finishing element of the type stated in the preamble is characterized according to the invention in that the rim comprises a relatively flexible rim body of a bituminous or plastic wall-covering material which, at least in the mounted situation, is connected at least substantially liquid-tightly to the core body. The relatively flexible rim body can be attached liquid-tightly to a surface of the construction part by being glued, burned, welded or otherwise adhered thereto, and thereby ensures a completely leak-tight finishing of the whole. The flexibility of the rim body here enhances a corresponding connection to the surface even when the latter is not entirely flat or even. A rim body manufactured from material which is the same as, similar to or at least significantly compatible with the material of a wall surface of a construction will generally be adhered thereto in particularly reliable and tried and tested manner. Since a wall of an object, such as a roof of a house or other type of building, is usually provided with a layer of bituminous or plastic wall-covering material for the purpose of a leak-tight finish, the present invention fits this closely by making use of a rim body of a corresponding bituminous or plastic wall-covering material. A finishing element is thus provided with which a construction part, from which a construction element extends with a free outer end, can be finished in reliably liquid-tight manner in a relatively short period of time and in relatively simple manner.

A preferred embodiment of the finishing element of the present invention has the feature that the core body comprises a first core part with a first cavity for adjustably receiving therein a first part of the shank-like outer end, and a second core part with a second cavity for adjustably receiving therein a second part of the shank-like outer end, and that the rim body lies clamped between the core parts. Owing to the adjustability of the two core parts the finishing element can thus be fixed as desired at a certain height above a surface for finishing, this being found in practice to be desirable in some cases.

A particular embodiment of the finishing element of the present invention has the feature that the first core part and the second core part comprise tubes with a drill hole for receiving the free outer end therein, wherein the two tubes each comprise a nut with an internal screw thread which connects fittingly to an external screw thread of the free outer end. A nut is a product generally available at low cost, and is thus a highly advantageous option for application on a construction element complementary thereto, such as for instance a fitting screw bolt or threaded end. The fitting closure here provides for a relatively simple, yet durable and reliable fastening option.

An alternative embodiment of the finishing element of the present invention has the feature that the first core part comprises a first jacket part and the second core part comprises a second jacket part, these jacket parts being mutually connected by at least one connecting member with liquid-tight enclosure of the rim body, and in a particular embodiment the finishing element of the present invention is characterized in that the jacket parts are screwed or riveted to each other.

A further particular embodiment of the finishing element of the present invention has the feature that the first jacket part is at least substantially flat and the second jacket part comprises an axial shank. Allowing a height of the axial shank to rise above a possible maximum liquid level around the finishing element prevents liquid being able to penetrate into the cavity inside the core body. A particular finishing element is thus provided which reliably seals in liquid-tight manner the surface of an object from which a construction element protrudes, even when the finishing element is under a relatively high liquid pressure, such as for instance when it is partially under water for a shorter or longer period of time.

Yet another further preferred embodiment of the finishing element of the present invention has the feature that the second jacket part comprises a base on a side of the shank directed toward the first jacket part, and that the second jacket part narrows uniformly toward a top lying opposite the base to at least substantially an outer diameter of the cavity. The uniform narrowing of the second jacket part provides for drainage of possible liquid around the finishing element. Prolonged exposure of the finishing element to a relatively high liquid pressure is thus prevented.

A further preferred embodiment of the finishing element of the present invention has the feature that the second core part leaves an open space up to the free outer end and that a plug nut is provided, which in the mounted position lies clampingly between the free outer end and the second core part for liquid-tight sealing of the open space. Where reference is made in the present invention to a plug nut, this is understood to mean any closing element which can be placed in the open space and provides a cavity for receiving the free outer end therein. The plug nut provides an effective, at least substantially hermetic liquid sealing and allows a certain tolerance in respect of fitting of the shank-like outer end in the cavity of the second jacket part. This tolerance enhances the convenience of placing of the finishing element. Use can moreover hereby be made of a core body of fixed dimensions which can be applied to different construction elements with varying diameter of the free outer end. Only a diameter of a cavity inside the relatively simple stopper body need be dimensioned in accordance with the diameter of the different construction elements. This simplifies a production process of the finishing element.

In a further preferred embodiment the finishing element of the present invention is characterized in that a part of the plug nut is provided with an elastomer body which in the mounted position connects liquid-tightly to the free outer end. A further preferred embodiment of the finishing element of the present invention has the feature that the part of the plug nut comprises resilient fingers which extend from another part of the nut. The resilient fingers are able and adapted to be moved, under pressure of an inner wall of the second core part, from a starting position, in which the plug nut can be readily arranged over the free outer end, into a clamping position in which the elastomer body is pressed liquid-tightly against the free outer end by the fingers. Yet another preferred embodiment of the finishing element of the present invention has the feature that the resilient fingers and the elastomer body are formed integrally.

A further preferred embodiment of the finishing element of the present invention has the feature that fixation means are provided for mutual fixing of the second core part and the plug nut in an axial direction along the free outer end. The fixation means prevent possible co-subsidence of the core body, and thus detaching thereof from the plug nut, due to a possible subsidence of a surface of a construction part on which the finishing element is mounted, wherein the open space between the second core part and the free outer end would be left clear for liquid penetration. In a particular embodiment hereof the finishing element of the present invention is characterized in that the fixation means comprise snap means, and in a further particular embodiment thereof the finishing element of the present invention is characterized in that the snap means comprise a snap shoulder on the plug nut which is intended and adapted to snap under a complementary shoulder in the second core part. The snap means, and in particular the snap shoulder, provide for a reliable axial fixation between the second core part and the plug nut. Such a fixing is not easy to release afterward. Such fixation means moreover generate an indication of a snapping, so that it is immediately apparent to a user during mounting of the plug nut when it has been arranged sufficiently far into the open space for fixation purposes.

A further preferred embodiment of the finishing element of the present invention has the feature that a distal outer end of the cavity in the core body is closed liquid-tightly. This prevents a liquid being able to penetrate into the cavity at the distal outer end.

The present invention also relates to a construction from which a construction element with a substantially shank-like free outer end protrudes, wherein the outer end is provided with a finishing element.

The present invention further relates to a method for liquid-tight sealing of a surface from which a shank-like outer end of a construction element protrudes. According to the present invention the method is characterized in that a finishing element according to the present invention is arranged liquid-tightly over the outer end and that the rim body of the finishing element is adhered liquid-tightly to the surface.

A preferred embodiment of the method according to the present invention is characterized in that the rim body is welded, burned, glued or otherwise adhered to the surface. It will be apparent to the skilled person who normally arranges the liquid-tight layer which adhesion technique can advantageously be used with a particular material.

The invention will be further elucidated hereinbelow on the basis of a number of exemplary embodiments and an accompanying drawing. In the drawing:

FIGS. 10A-10D show a perspective view of a fourth exemplary embodiment of a construction provided with a finishing element according to the invention, in respectively a first, second, third and fourth mounting position.

The figures are otherwise purely schematic and not drawn to scale. Some dimensions in particular may be exaggerated to a greater or lesser extent for the sake of clarity. Corresponding parts are designated as far as possible in the figures with the same reference numeral.

Figure 1:
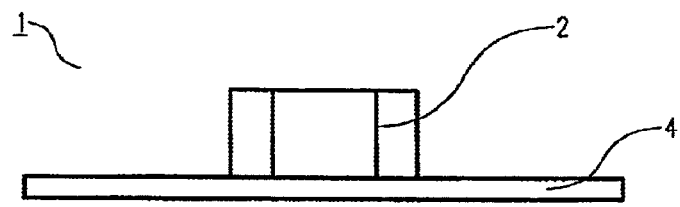
FIGS. 1-3 show respectively a front view, top view and perspective view of a first exemplary embodiment of a finishing element according to the invention.
Figure 2:
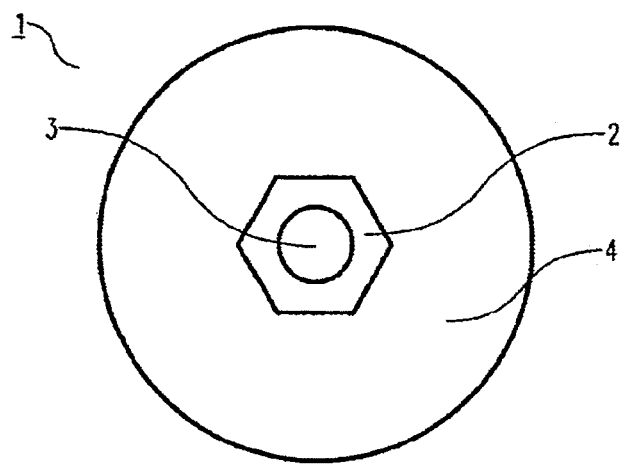
Figure 3:
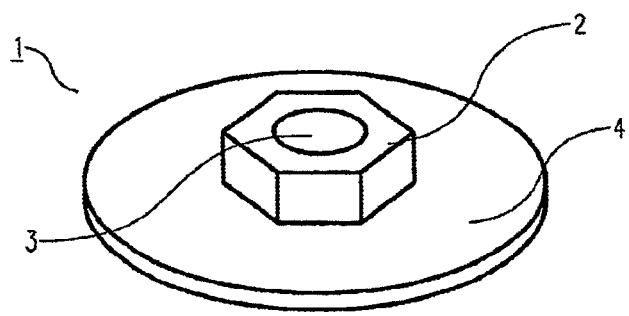

A first exemplary embodiment of a finishing element according to the invention is shown in FIGS. 1-3 in respectively a front view, top view and perspective view. As shown in FIG. 1, finishing element 1 comprises a relatively form-retaining core body 2 which is connected liquid-tightly on an underside to a rim 4, which extends laterally around the core body. Core body 2 comprises a central cavity 3, as further shown in FIG. 2. In order to enable durable and reliable attachment of finishing element 1 to a construction element which is provided on its outer end with an external screw thread, core body 2 comprises in cavity 3 an internal screw thread complementary to the external screw thread of the outer end. In the cavity the core body can be provided with a groove in which a rubber sealing ring is situated as liquid barrier for the purpose of preventing a liquid penetrating cavity 3 via the screw thread when this latter does not seal sufficiently well. Another liquid barrier can also be applied in the cavity instead of a sealing ring, such as for instance a piece of tape, in particular insulating tape, a liquid-tight paste or a barrier of cured resin. Although the shape, material and dimensions of form-retaining core body 2 can be varied as desired, this first exemplary embodiment makes use of a nut because this is a commercial product generally available at a low cost price. With a view to durability and reliability, the nut is made from stainless steel. Rim 4 comprises a relatively flexible rim body of bituminous or plastic wall-covering material, in particular bituminous or plastic roof-covering material. A central part of the flexible rim body 4 is glued liquid-tightly to core body 2 using an adhesive, in particular a suitable type of glue.

The first exemplary embodiment of finishing element 1, as shown in FIGS. 1-3, is a relatively simple finishing element with an advantageous cost price which can be arranged relatively quickly over a shank-like free outer end of a construction element protruding from a surface of an object for the purpose of liquid-tight finishing thereof.

The outer end is here received at least substantially fitting into cavity 3, thus preventing a liquid being able to penetrate between the core body and the outer end. The flexible rim body 4 is adhered liquid-tightly to the surface of the object in relatively simple manner, for instance by welding, burning or gluing, so as to prevent a liquid entering between the flexible rim body 4 and the surface of the object.

Figure 4:
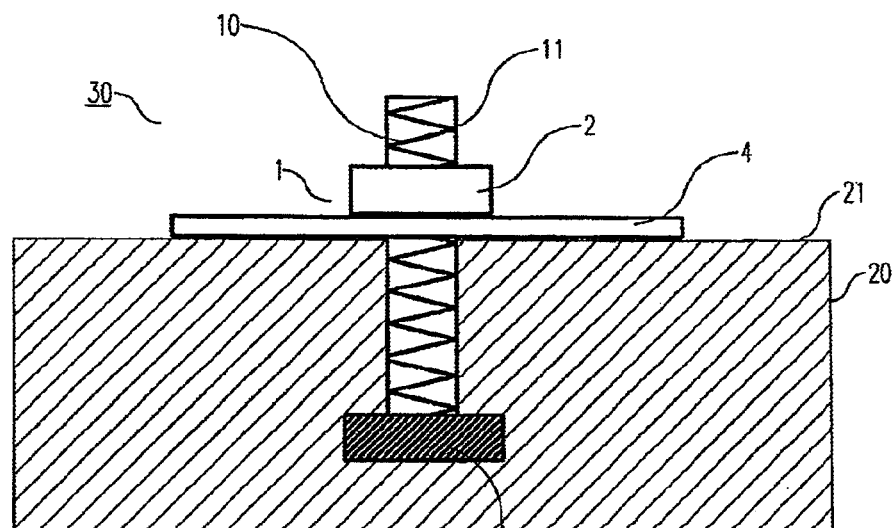
FIG. 4 shows a front view of a first exemplary embodiment of a construction provided with a finishing element according to the invention.

FIG. 4 shows a front view of a first exemplary embodiment of a construction according to the invention. Construction 30 comprises an object 20, for instance a concrete wall or roof, in which a fastening means 12, for instance a bolt, is anchored. Fastening means 12 protrudes with an at least substantially shank-like free outer end 10 through a surface 21 of the object. For liquid-tight sealing of surface 21 a finishing element 1 with a core body 2 and flexible rim body 4 is arranged on the shank-like free outer end 10 as far as surface 21. Outer end 10 here protrudes through a cavity in core body 2 and a central opening in the flexible rim body 4. The flexible rim body 4 of finishing element 1 extends laterally from and around core body 2 and outer end 10, and is glued firmly to surface 21 with an adhesive suitable for the purpose. Rim body 4 comprises a flexible, liquid-tight sealing flap or rosette which prevents a liquid penetrating therethrough. Rim body 4 can be manufactured from a bituminous or plastic wall-covering material and is preferably substantially the same as the material of surface 21. For a durable and reliable attachment of finishing element 1 on outer end 21, outer end 21 is provided with a metric external screw thread 11 which is complementary to an internal screw thread in the cavity of core body 2.

Figure 5:
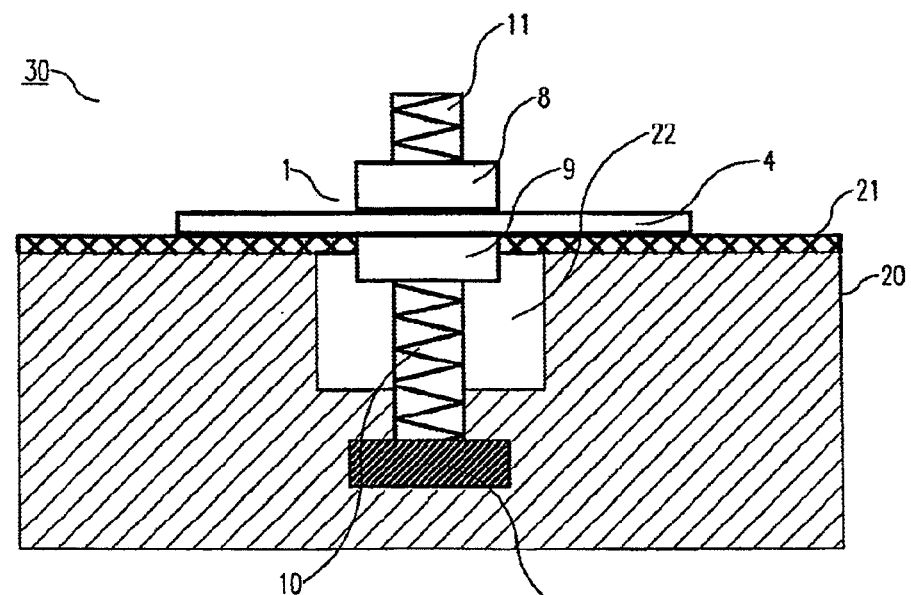
FIG. 5 shows a front view of a second exemplary embodiment of a construction provided with a finishing element according to the invention.

FIG. 5 shows a front view of a second exemplary embodiment of a construction according to the invention. Construction 30 comprises a roof 20 which is provided on a surface 21 with a layer of roof-covering material. Anchored in roof 20 is a screw bolt 12, a free outer end 10 of which protrudes through surface 21. A finishing element 1 with a core body 2 and a flexible rim body 4 is arranged on free outer end 10. In order to prevent finishing element 1 being arranged unnecessarily far over outer end 10 and passing through the layer of roof-covering material on surface 21 into an unevenness 22, such as a recess, in object 20, core body 2 comprises a first core part 8 and a second core part 9. Second core part 9 can be arranged at a desired height on outer end 10 of screw bolt 12 so that the rim body 4 and the first core part 8 to which rim body 4 is attached can then be rotated against second core part 9, and herein be arranged at the correct height relative to surface 21. Rim body 4 is here clamped liquid-tightly between the two core parts, thus preventing a liquid penetrating between the rim body and a core part. Rim body 4 is manufactured from a material which is the same as the roof-covering material of surface 21, in particular a bituminous roof-covering material, so that rim body 4 can be adhered firmly to the surface, for instance by means of burning.

Figure 6:
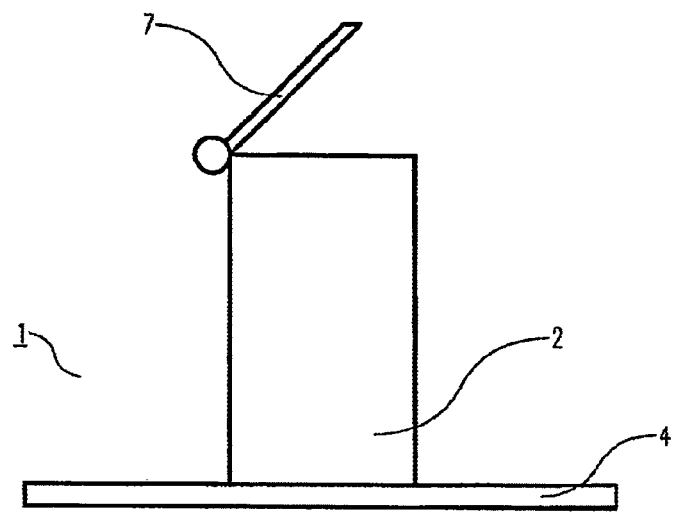
FIGS. 6, 7 show respectively a front view and perspective view of a second exemplary embodiment of a finishing element according to the invention.
Figure 7:
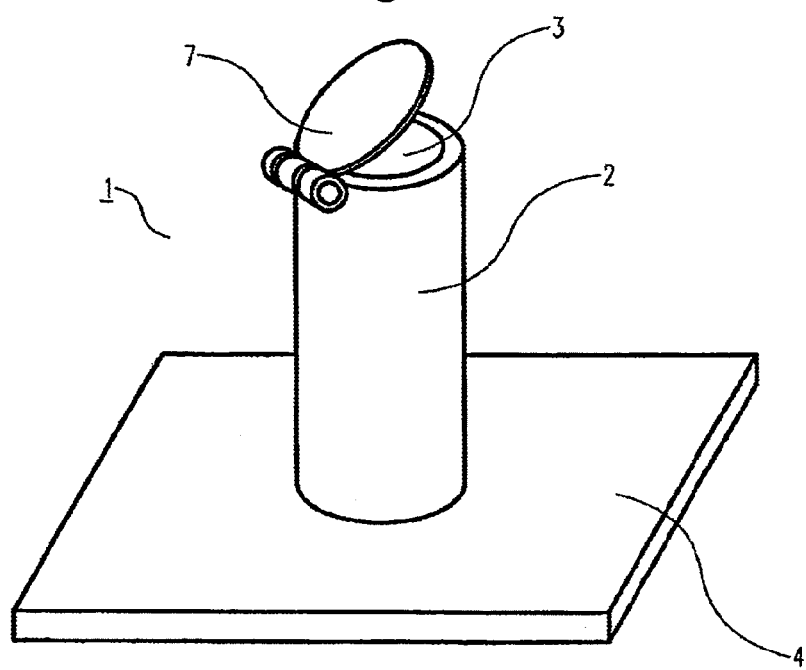

A second exemplary embodiment of a finishing element according to the invention is shown in FIGS. 6 and 7 in respectively a front view and perspective view. This exemplary embodiment is largely similar to the above described exemplary embodiments, although in this embodiment finishing element 1 comprises a relatively elongate core body 2 which is attached liquid-tightly to a flexible rim 4. Flexible rim 4 has by way of illustration a square shape in this exemplary embodiment, but can have another desired shape depending on the situation, as long as rim body 4 extends laterally around core body 2. In this exemplary embodiment core body 2 is relatively elongate, with an elongate cavity 3, so that the shank-like outer end of a construction element can be received in its entirety in cavity 3. In order to prevent a liquid penetrating into the cavity a height of elongate core 2 is adapted to a possible maximum liquid level around the construction element, wherein the height of core body 2 rises above the maximum liquid level. Core body 2 can however also be relatively flat in the case the shank-like outer end of the construction element protrudes a little. In order to wholly preclude a liquid being able to penetrate into cavity 3, cavity 3 is sealed liquid-tightly at a distal outer end. A relatively simple embodiment hereof is that the core body is closed at the distal outer end. In this exemplary embodiment however, core body 2 comprises at the distal outer end a valve body 7 with which the cavity can be sealed liquid-tightly at the distal outer end. Valve body 7 can be placed in an open position by means of for instance hinge means or spring means, so that the cavity is left open. Another possibility for liquid-tight closure of the distal outer end of the cavity is by means of a cap.

Figure 8:
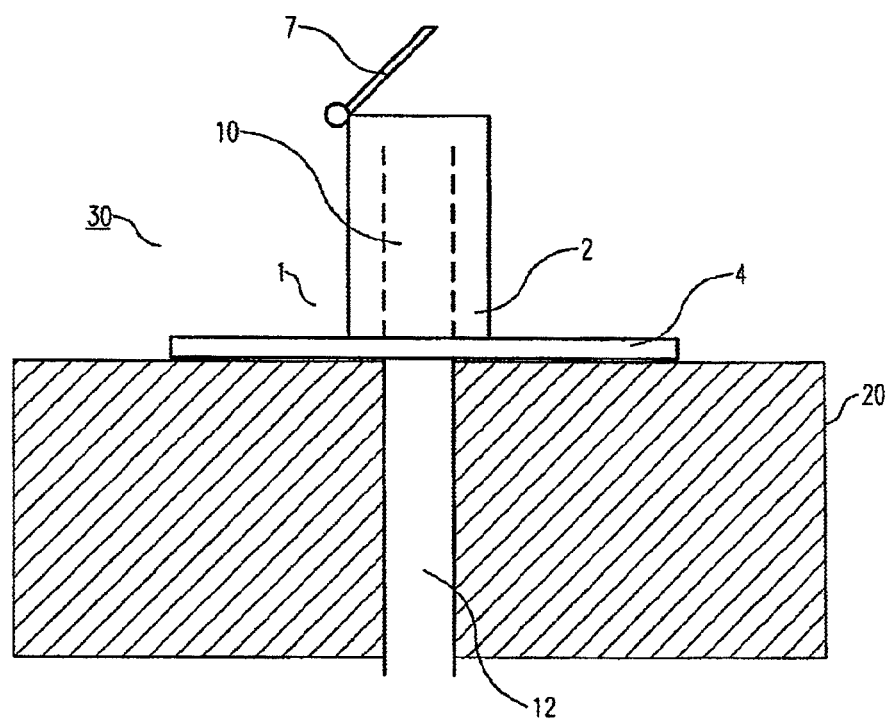
FIG. 8 shows a front view of a third exemplary embodiment of a construction provided with a finishing element according to the invention.

FIG. 8 shows a front view of a third exemplary embodiment of a construction according to the invention. This is exemplary embodiment is largely similar to the above described exemplary embodiments, although in this embodiment construction element 12 protrudes through object 20. Construction element 12 comprises a tubular body with a relatively smooth outer side and an open cavity on either side of object 20. The cavity provides the option of carrying something through object 20, such as for instance a cable. In order to prevent a liquid being able to penetrate into the cavity a finishing element 1 with a core body 2 and flexible rim 4 is arranged over a substantially shank-like free outer end 10 of the construction element. The finishing element can here be sealed at a distal outer end with a valve body 7. Because construction element 12 has a relatively smooth outer side in this exemplary embodiment, finishing element 1 is attached liquid-tightly to object 20 by means of flexible rim 4.

Figure 9:
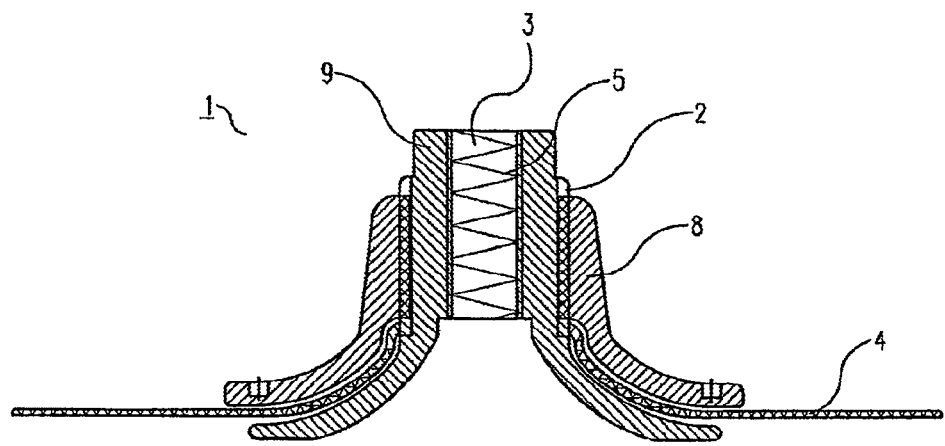
FIG. 9 shows a front view of a third exemplary embodiment of a finishing element according to the invention.

FIG. 9 shows a front view of a third exemplary embodiment according to the invention. Finishing element 1 comprises a core body 2 with a first core part 8 and a second core part 9, which can be screwed together by means of an internal screw thread of first core part 8 and a complementary external screw thread of second core part 9. Although first core part 8 can be screwed manually onto second core part 9, for an extra-strong and reliable tightening core part 8 is provided close to a proximal outer end with recesses to enable engagement therein with a suitable auxiliary tool. Second core part 9 comprises a cavity 3 for fittingly receiving therein a protruding outer end of a construction element. Second core part 9 is provided in the cavity with an internal screw thread for fixing onto the outer end of the construction element provided with a complementary external screw thread. In order to provide a relatively lightweight finishing element 1 core parts 8,9 are made from aluminium. A flexible rim body 4 lies with a central part clamped between the two core parts and a laterally protruding part thereof can be fastened liquid-tightly to a surface of an object. As an additional barrier to a liquid, core parts 8,9 and the intermediate central part of rim body 4 curve upward relative to a surface to which finishing element 1 is adhered. Because core parts 8,9 curve, sharp edges, whereby the flexible rim could be affected, are avoided. A lightweight and extremely reliable finishing element is thus provided, with which the outer end of a construction element with a substantially shank-like free outer end can be finished in liquid-tight manner in relatively short time. A liquid is here prevented from penetrating the object through gaps around the construction element.

Figure 10E:
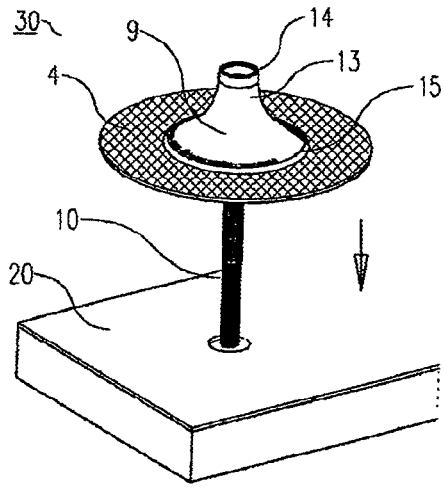
FIG. 10E shows a perspective view of a cross-section of the fourth exemplary embodiment of a construction provided with a finishing element according to the invention.
Figure 10E:
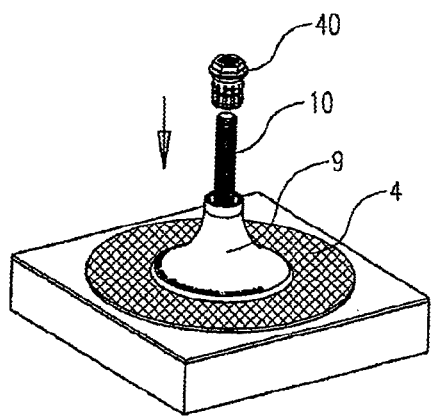
Figure 10E:
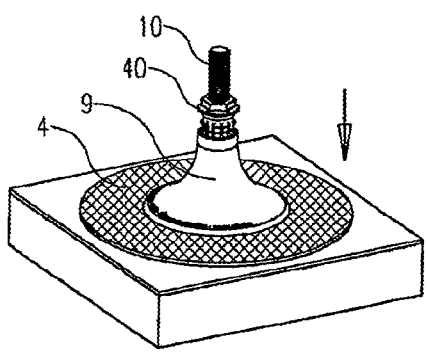
Figure 10E:
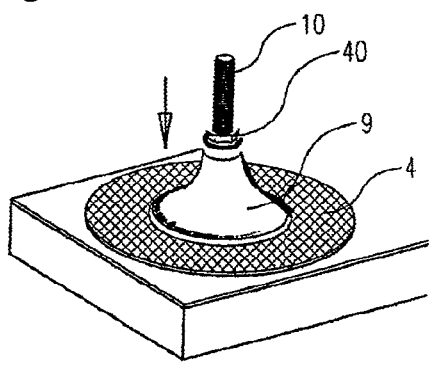
Figure 10E:
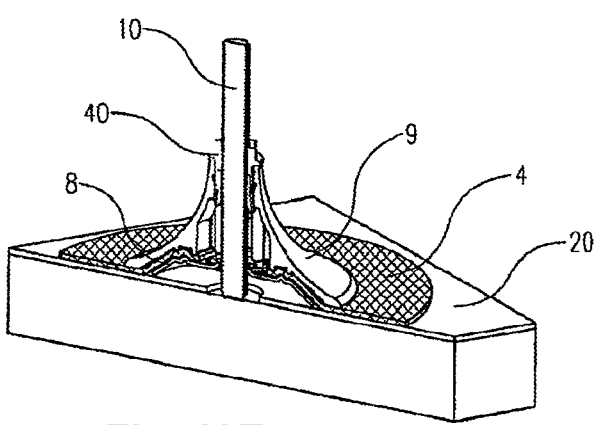

FIGS. 10A-10D show a fourth exemplary embodiment of a construction provided with a finishing element according to the invention in respectively a first, second, third and fourth mounting position, and FIG. 10E shows a perspective view of a cross-section. Construction 30 comprises an object 20 from which a construction element with a free outer end 10 protrudes, over which a finishing element can be placed. The finishing element comprises a core body with a first jacket part 8 and a second jacket part 9 which are connected to each other, thus enclosing a flexible rim body 4 in liquid-tight manner. First jacket part 8 is substantially flat so that rim body 4 can be adhered thereover to the surface of object 20 in at least substantially flat and liquid-tight manner. Second jacket part 9 comprises an at least substantially axial shank 13, the height of which can be dimensioned such that a top 14 of second jacket part 9 rises above a possible liquid level around finishing element 1. Shank 13 here narrows uniformly toward the top from a base 15 so as to enhance drainage of possible liquid. In order to enable simple arrangement of second jacket part 9 over the free outer end 10, second jacket part 9 is dimensioned such that it leaves an open space up to free outer end 10. After second jacket part 9 has been arranged over the free outer end and rim body 4 has been adhered to a surface of the object, a plug nut 40 is arranged along free outer end 10 and into the open space. In a fully mounted position plug nut 40 lies clampingly in the open space between free outer end 10 and an inner wall of second jacket part 9. The open space is here sealed in leak-tight manner.

By applying plug nut 40 it is moreover possible to make use, for core body 2, of a single dimensioning which can be applied to different construction elements with varying diameters of the free outer end. The relatively simple plug nut can be readily produced in different dimensions, wherein a diameter of a cavity in the plug nut corresponds to a diameter of the free outer end over which the finishing element is arranged, while an outer diameter of the plug nut remains the same in order to fit liquid-tightly in the cavity of core body 2. A plug nut can for instance thus be manufactured which fits liquid-tightly on the most common dimensions of threaded ends or smooth rods, such as M12, M14, M16, M20, M22 and M24.

Figure 11:
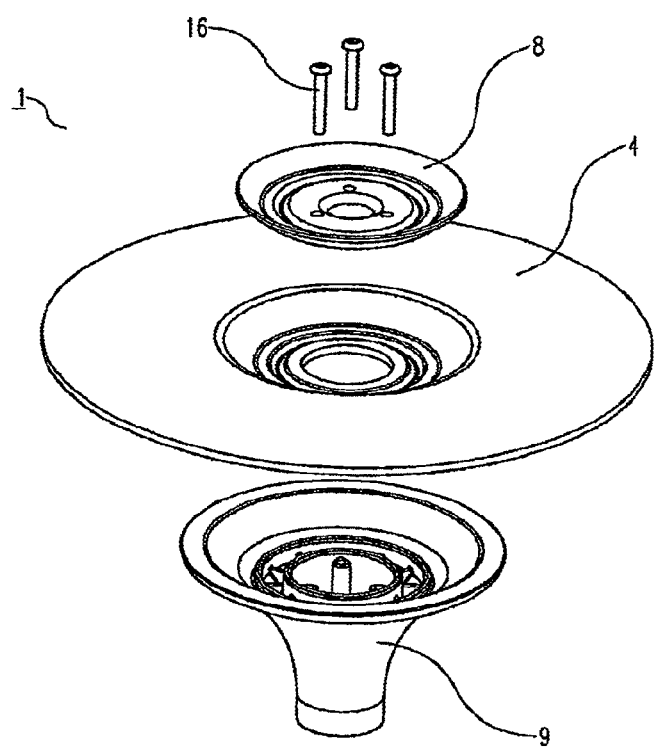
FIG. 11 shows a perspective view of a first core part, second core part, rim body and connecting member of the fourth exemplary embodiment of a construction provided with a finishing element according to the invention.
Figure 12A:
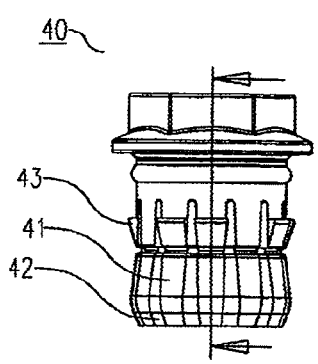
FIGS. 12A-12D show respectively a front view, cross-sectional view, top view and perspective view of a plug nut as applied in the fourth exemplary embodiment of a construction provided with a finishing element according to the invention.
Figure 12B:
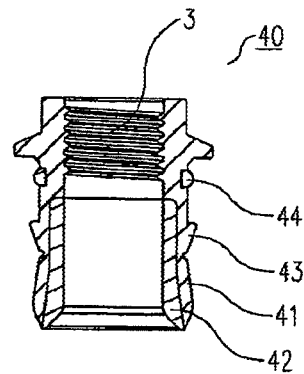
Figure 12C:
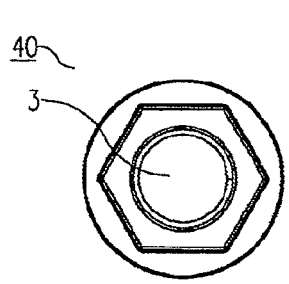
Figure 12D:
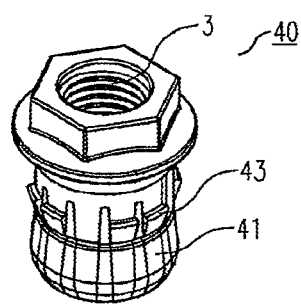

As FIG. 11 further shows in a perspective view of a first core part, second core part, rim body and connecting member of the finishing element of the fourth exemplary embodiment of a construction according to the invention, finishing element 1 comprises an at least substantially flat first jacket part 8 and a sloping second jacket part 9. In a lightweight variant the jacket parts 8,9 are made from plastic. Such plastic jacket parts can moreover be manufactured in relatively simple manner with known processes. A way of precluding that a liquid can penetrate between core body 2 and rim body 4 is to manufacture both rim body 4 and core body 2 from plastic and to foam rim body 4 with a central part into core body 2. In this exemplary embodiment however, jacket parts 8,9 are screwed or riveted together by at least one connecting member 16, such as a screw, bolt or pop rivet, while liquid-tightly enclosing a flexible rim body 4.

As FIGS. 12A-12D further show in respectively a front view, cross-sectional view, top view and perspective view of a plug nut as applied in the fourth exemplary embodiment of a construction according to the invention, plug nut 40 comprises resilient fingers 41. Between fingers 41 and against an inner wall of the plug nut, the plug nut is provided with an elastomer body 42. Elastomer body 42 is made from a relatively flexible material, such as for instance rubber. Fingers 41, which are for instance made from plastic, and elastomer body 42 are ideally manufactured in one production step so that they are integrally connected to each other. Resilient fingers 41 are able and adapted to be moved, under pressure of an inner wall of the second core part, from a starting position, in which the plug nut can be readily arranged over the free outer end, into a clamping position in which the elastomer body is pressed liquid-tightly against the free outer end by the fingers. By giving a circumference of a cavity in second core part 9 a smaller dimension than a circumference of fingers 41 in the starting position, fingers 41 will be pressed into the clamping position when plug nut 40 is arranged in the cavity.

For an extra-reliable liquid-tight fastening of plug nut 40 in the open space, plug nut 40 is provided on an outer side with additional sealing means 44 in the form of a rubber O-ring. O-ring 44 wholly prevents a liquid being able to leak through between second core part 9 and plug nut 40.

Plug nut 40 is further provided with a number of snap shoulders 43 intended and adapted to snap under complementary shoulders in the second core part. Snap shoulders 43 provide for a reliable axial fixation between the second core part and the plug nut. Snap shoulders 43 hereby prevent co-subsidence of the core body, and thus detaching thereof from the plug nut, due to a possible subsidence of a surface of a construction part on which the finishing element is mounted, wherein the open space between the second core part and the free outer end would be left clear for liquid penetration. When the plug nut is arranged it is moreover discernible to a user that the snap shoulders snap beneath the complementary shoulders so that it is immediately apparent to the user during mounting of the plug nut when it has been arranged sufficiently far into the open space for fixation purposes.

Plug nut 40 can be formed from two parts, which in a first position enclose a cavity and in a second position leave the cavity clear. The two parts can here be coupled to each other in simple manner using a coupling suitable for the purpose, such as for instance by a snap connection. It is hereby possible to fasten plug nut 40 round the free outer end directly above second jacket part 9, so that plug nut 40 does not have to be moved over a full length along the free outer end. This makes a considerable difference in the assembly time required, particularly when use is made of a plug nut 40 with an internal screw thread within the cavity which is complementary to an external screw thread on the free outer end.

Figure 13:
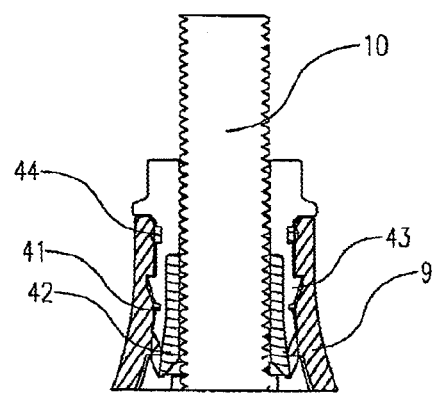
FIG. 13 shows a cross-sectional view of an upper part of the fourth exemplary embodiment of a construction provided with a finishing element according to the invention.

FIG. 13 further shows, in a cross-sectional view of an upper part of the fourth exemplary embodiment of a construction according to the invention, how in a mounted position the plastic plug nut 40 lies clampingly between free outer end 10 and an upper part of second core part 9 for the purpose of liquid-tight sealing of the open space. In the mounted position the resilient fingers 41 are pressed against free outer end 10 by an inner wall of second core part 9. Snap shoulders 43 here snap beneath a complementary shoulder in second core part 9 for fixation of the plug nut and the second core part.

Although the invention has been further elucidated with reference to only a few exemplary embodiments, it will be apparent that the invention is by no means limited thereto. On the contrary, many other variations and embodiments are possible within the scope of the invention for the person with ordinary skill in the art.

The invention claimed is:

1. A finishing element for liquid-tight finishing of a free outer end of a construction element, the finishing element comprising:

a relatively form-retaining core body, the core body including a first core part with a first cavity for adjustably receiving therein a part of the free outer end of the construction element, and a second core part with a second cavity for adjustably receiving therein a part of the free outer end of the construction element; and a relatively flexible rim body of a bituminous or plastic wall-covering material which, at least in the mounted situation, is connected at least substantially liquid-tightly to the core body, the rim body lying clamped between the first and second core parts and extending laterally around the core body in at least a substantially liquid-tight manner, wherein a liquid barrier is provided between the core body and the free outer end of the construction element, characterized in that the second core part leaves an open space up to the free outer end and the liquid barrier comprises a plug nut which, in the mounted position, lies clampingly between the free outer end and the second core part for liquid-tight sealing of the open space.

2. The finishing element as claimed in claim 1, wherein the first core part includes a first jacket part, and the second core part includes a second jacket part, the first and second jacket parts being mutually connected by at least one connecting member with liquid-tight enclosure of the rim body.

3. The finishing element as claimed in claim 2, wherein the first and second jacket parts are screwed or riveted to each other.

4. The finishing element as claimed in claim 3, wherein the first jacket part is at least substantially flat and the second jacket part comprises an axial shank.

5. The finishing element as claimed in claim 4, wherein the second jacket part comprises a base on a side of the free outer end directed towards the first jacket part, and wherein the second jacket part narrows uniformly towards a top lying opposite the base to at least substantially an outer diameter of the second cavity.

6. The finishing element as claimed in claim 2, wherein the first jacket part is at least substantially flat and the second jacket part comprises an axial shank.

7. The finishing element as claimed in claim 6, wherein the second jacket part comprises a base on a side of the free outer end directed towards the first jacket part, and wherein the second jacket part narrows uniformly towards a top lying opposite the base to at least substantially an outer diameter of the second cavity.

8. The finishing element as claimed in claim 1, wherein a part of the plug nut is provided with an elastomer body which in the mounted position connects liquid-tightly to the free outer end.

9. The finishing element as claimed in claim 8, wherein the part of the plug nut comprises resilient fingers which extend from another part of the nut.

10. The finishing element as claimed in claim 9, wherein the resilient fingers and the elastomer body are formed integrally.

11. The finishing element as claimed in claim 1, further comprising fixation means for mutual fixing of the second core part and the plug nut in an axial direction along the free outer end.

12. The finishing element as claimed in claim 11, wherein the fixation means comprise snap means.

13. The finishing element as claimed in claim 12, wherein the snap means comprise a snap shoulder on the plug nut, the snap shoulder adapted to snap under a complementary shoulder in the second core part.

14. A construction from which a construction element with a free outer end protrudes, wherein the outer end is provided with a finishing element as claimed in any one of claims 1, 2, 3-7, and 8-13.

15. A method for liquid-tight sealing of a surface from which an outer end of a construction element protrudes, said method comprising arranging a finishing element as claimed in any one of claims 1, 2, 3-7, and 8-13 over the outer end of the construction element such, that the rim body of the finishing element is adhered liquid-tightly to the surface.

16. The method as claimed in claim 15, wherein the rim body is welded, burned, glued or otherwise adhered to the surface.

* * * * *